United States Patent
Zeng et al.

(10) Patent No.: US 11,527,777 B2
(45) Date of Patent: Dec. 13, 2022

(54) NON-AQUEOUS ELECTROLYTE FOR LITHIUM-ION BATTERY AND LITHIUM-ION BATTERY USING NON-AQUEOUS ELECTROLYTE

(71) Applicant: Zhuhai CosMX Battery Co., Ltd., Zhuhai (CN)

(72) Inventors: Changan Zeng, Zhuhai (CN); Suli Li, Zhuhai (CN)

(73) Assignee: ZHUHAI COSMX BATTERY CO., LTD.

( * ) Notice: Subject to any disclaimer, the term of this patent is extended or adjusted under 35 U.S.C. 154(b) by 193 days.

(21) Appl. No.: 17/119,252

(22) Filed: Dec. 11, 2020

(65) Prior Publication Data
US 2021/0408606 A1    Dec. 30, 2021

(30) Foreign Application Priority Data
Jun. 30, 2020    (CN) .......................... 202010615105.3

(51) Int. Cl.
| | | |
|---|---|---|
| H01M 4/00 | (2006.01) | |
| H01M 10/0569 | (2010.01) | |
| H01M 4/131 | (2010.01) | |
| H01M 4/133 | (2010.01) | |
| H01M 4/134 | (2010.01) | |
| H01M 4/36 | (2006.01) | |
| H01M 4/38 | (2006.01) | |
| H01M 4/505 | (2010.01) | |
| H01M 4/525 | (2010.01) | |
| H01M 10/0525 | (2010.01) | |
| H01M 4/02 | (2006.01) | |

(52) U.S. Cl.
CPC ....... *H01M 10/0569* (2013.01); *H01M 4/131* (2013.01); *H01M 4/133* (2013.01); *H01M 4/134* (2013.01); *H01M 4/366* (2013.01); *H01M 4/386* (2013.01); *H01M 4/505* (2013.01); *H01M 4/525* (2013.01); *H01M 10/0525* (2013.01); *H01M 2004/027* (2013.01); *H01M 2004/028* (2013.01)

(58) Field of Classification Search
CPC .......... H01M 2004/028; H01M 4/399; H01M 4/386; H01M 2300/0025; H01M 4/134; H01M 4/587; Y02E 60/10
See application file for complete search history.

(56) References Cited

U.S. PATENT DOCUMENTS

| | | | | |
|---|---|---|---|---|
| 11,367,902 | B2* | 6/2022 | Roy | H01M 4/131 |
| 2011/0311864 | A1* | 12/2011 | Yamada | H01M 4/366 |
| | | | | 429/188 |
| 2016/0294007 | A1 | 10/2016 | Kefei | |

FOREIGN PATENT DOCUMENTS

| | | |
|---|---|---|
| CN | 104766995 A | 7/2015 |
| CN | 106025306 A | 10/2016 |
| CN | 106058316 A | 10/2016 |
| CN | 106450457 B | 4/2019 |
| CN | 110808413 A | 2/2020 |
| CN | 110867613 A | 3/2020 |
| EP | 2706600 A1 | 3/2014 |
| JP | 2009211921 A | 9/2009 |
| WO | 2018086378 A1 | 5/2018 |

OTHER PUBLICATIONS

European Search Report in EP Patent Application No. 20215529.7 dated Jun. 14, 2021.
Chinese Office Action in related Chinese Application No. 202010615105.3; dated Apr. 23, 2021, 6 pages.

* cited by examiner

*Primary Examiner* — Cynthia H Kelly
*Assistant Examiner* — Monique M Wills
(74) *Attorney, Agent, or Firm* — Dilworth IP, LLC

(57) ABSTRACT

The present disclosure provides a non-aqueous electrolyte for a lithium-ion battery and a lithium-ion battery using the non-aqueous electrolyte. The non-aqueous electrolyte includes (a) a lithium, (b) a non-aqueous organic solvent, and (c) at least one compound represented by formula 1;

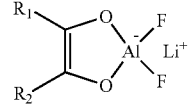

Formula 1 where the non-aqueous electrolyte further includes at least one of the following components (d) and (e): (d) a nitrile compound including at least one of 1,3,6-hexane trinitrile, glycerol trinitrile, and 3-methoxypropionitrile, and (e) vinyl sulfate. Through the synergy effect between them, the positive electrode is protected and meanwhile the negative electrode is also be protected to a certain extent, and an impedance of a film is lowered. The battery has an excellent high temperature storage performance, high temperature cycle performance and low temperature charge and discharge performance.

12 Claims, No Drawings

NON-AQUEOUS ELECTROLYTE FOR LITHIUM-ION BATTERY AND LITHIUM-ION BATTERY USING NON-AQUEOUS ELECTROLYTE

CROSS-REFERENCE TO RELATED APPLICATIONS

This application claims priority to Chinese Patent Application No. 202010615105.3, filed on Jun. 30, 2020, entitled "non-aqueous electrolyte for lithium-ion battery and lithium-ion battery using non-aqueous electrolyte", which is hereby-incorporated by reference in its entirety.

TECHNICAL FIELD

The present disclosure belongs to the technical field of electrolytes for lithium-ion batteries, and specifically relates to a non-aqueous electrolyte for a lithium-ion battery and a lithium-ion battery using the non-aqueous electrolyte.

BACKGROUND

Since commercialization of a lithium-ion battery, the lithium-ion battery has been widely used in the fields of digital, energy storage, power, military aerospace and communication equipment and etc., and due to its lightness, high specific energy, no memory effect and good cycle performance. With a widespread application of the lithium-ion battery, consumers have put forward higher requirements for an energy-density, cycle life, high temperature performance, safety- and other performances of the lithium-ion battery.

Most lithium-ion battery products have a problem that high temperature performance and low temperature performance cannot be taken into account together Therefore, an additive is usually added into an electrolyte to improve the high and low temperature performances of the lithium-ion battery. However, when a general additive has a better high-temperature effect, its impedance is large, while a high-temperature effect of a low-impedance additive is not enough. Therefore, it is necessary to optimize a combination of additives to obtain excellent high and low temperature performances.

SUMMARY

In order to overcome the shortcomings of the prior art, the present disclosure provides a non-aqueous electrolyte for a lithium-ion battery and a lithium-ion battery-using the non-aqueous electrolyte. The non-aqueous electrolyte includes (a) a lithium, (b) a non-aqueous organic solvent, and (c) at least one compound represented by formula 1; where the non-aqueous electrolyte further includes at least one of the following components (d) and (e): (d) a nitrile compound, and (e) vinyl sulfate. The impedance of the lithium-ion battery can be reduced through an synergy effect between them, and at the same time, the lithium-ion battery has a good high temperature storage performance, high temperature cycle performance, and low temperature charge and discharge performance.

The present disclosure is achieved through the following technical solution:

a non-aqueous electrolyte, the non-aqueous electrolyte including (a) a lithium, (b) a non-aqueous organic solvent, and (c) at least one compound represented by formula 1; where the non-aqueous electrolyte further includes at least one of the following components (d) and (e):

(d) a nitrile compound including at least one of 1,3,6-hexane trinitrile, glycerol trinitrile and 3-methoxypropionitrile, and (e) vinyl sulfate,

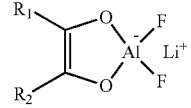

Formula 1 where $R_1$ and $R_2$ are the same or different, and are each independently selected from hydrogen, halogen, a halogen-substituted or unsubstituted $C_1$-$C_6$ alkyl group, a halogen-substituted or unsubstituted $C_2$-$C_5$ alkenyl group, or a halogen-substituted or unsubstituted $C_2$-$C_5$ alkynyl group.

According to the present disclosure, $R_1$ and $R_2$ are the same or different, and are each independently selected from hydrogen, halogen, a halogen substituted or unsubstituted $C_1$-$C_5$ alkyl group.

According to the present disclosure, $R_1$ and $R_2$ are the same or different, and are each independently selected from hydrogen, fluorine, a methyl group, an ethyl group or a propyl group.

According to the present disclosure, the compound represented by formula 1 is selected from at least one of the following compounds A1 to A5:

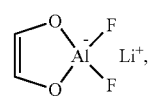

A1

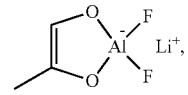

A2

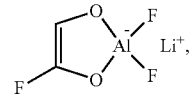

A3

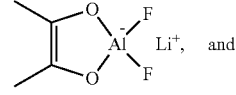

A4

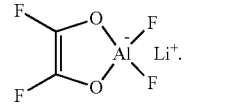

A5

According to the present disclosure, the nitrile compound is selected from at least one of 1,3,6-hexane trinitrile, glycerol trinitrile and 3-methoxypropionitrile, a selection of the nitrile compound can make the non-aqueous electrolyte of the present disclosure have a better high-temperature storage performance and a better high-temperature cycle performance.

According to the present disclosure, a content of the compound represented by formula 1 is 0.1-10 wt % of a total mass of the non-aqueous electrolyte, for example, 0.1 wt %, 0.2 wt %, 0.5 wt %, 1.0 wt %, 1.5 wt %. 2 wt %, 2.5 wt %, 3 wt %. 3.5 wt %, 4 wt %, 4.5 wt %, 5 wt %, 5.5 wt %, 6 wt %, 6.5 wt %, 7 wt %, 7.5 wt %, 8 wt %, 8.5 wt %, 9 wt %, 9.5 wt % or 10 wt %.

According to the present disclosure, a content of the nitrile compound is 0-8 wt % of the total mass of the non-aqueous electrolyte, preferably 0.1-8 wt %, for example, 0.1 wt %, 0.2 wt %, 0.5 wt %, 1.0 wt %, 1.5 wt %, 2 wt %, 2.5 wt %, 3 wt %, 3.5 wt %, 4 wt %, 4.5 wt %, 5 wt %, 5.5 wt %, 6 wt %, 6.5 wt %, 7 wt %, 7.5 wt % or 8 wt %.

According to the present disclosure, a content of the vinyl sulfate is 0-2 wt % of the total mass of the non-aqueous electrolyte, preferably 0.1-2 wt %, for example, 0.1 wt %, 0.2 wt %, 0.5 wt %, 1.0 wt %, 1.5 wt % or 2 wt %.

According to the present disclosure, the lithium is selected from one or more of lithium hexafluorophosphate, lithium difluorophosphate, lithium difluorooxalate borate, lithium bisfluorosulfonimide, lithium bistrifluoromethanesulfonimide, lithium difluorobisoxalate phosphate, lithium tetrafluoroborate, lithium bis oxalate borate, lithium hexafluoroantimonate, lithium hexafluoroarsenate, lithium bis(trifluoromethylsulfonyl)imide, lithium bis(pentafluoroethylsulfonyl)imide, lithium tris(trifluoromethylsulfonyl)methyl, and lithium bis(trifluoromethylsulfonyl)imide.

According to the present disclosure, a content of the lithium is 12-18 wt % of the total mass of the non-aqueous electrolyte, for example, 12 wt %, 12.5 wt %, 13 wt %, 13.5 wt %, 14 wt %, 14.5 wt %, 15 wt %. 15.5 wt %, 16 wt %, 16.5 wt %, 17 wt %, 17.5 wt % or 18 wt %.

According to the present disclosure, the non-aqueous organic solvent is selected from carbonate and/or carboxylate.

Exemplarily, the carbonate is selected from one or more of the following fluorinated or unsubstituted solvents: ethylene carbonate, propylene carbonate, dimethyl carbonate, diethyl carbonate, and ethyl methyl carbonate.

Exemplarily, the carboxylate is selected from one or more of the following fluorinated or unsubstituted solvents: propyl acetate, n-butyl acetate, isobutyi acetate, n-pentyl acetate, isoamylacetate, ethyl propionate, n-propyl propionate, methyl butyrate, and ethyl n-butyrate.

The present disclosure also provides a method for preparing the above-mentioned non-aqueous electrolyte. The method includes the following steps:

mixing (a) a lithium, (b) a non-aqueous organic solvent, (c) at least one compound represented by formula 1, and (d) a nitrile compound including at least one of 1,3,6-hexane trinitrile, glycerol trinitrile, and 3-methoxypropionitrile; or, mixing (a) lithium, (b) a non-aqueous organic solvent, (c) at least one compound represented by formula 1 and (e) vinyl sulfate; or, mixing (a) a lithium, (b) a non-aqueous organic solvent, (c) at least one compound represented by formula 1, (d) a nitrile compound including at least one of 1,3,6-hexane trinitrile, glycerol trinitrile, and 3-methoxypropionitrile and (e) vinyl sulfate;

obtaining the prepared non-aqueous electrolyte.

Exemplarily, the method includes the following steps:

mixing (b) a non-aqueous organic solvent, (c) at least one compound represented by formula 1, (d) a nitrile compound including at least one of 1,3,6-hexane trinitrile, glycerol trinitrile, and 3-methoxypropionitrile evenly, and detecting moisture, and after the moisture is detected to be qualified, then freezing at a low temperature about $-10°$ C. for 2-5 hours, and then adding (a) a lithium quickly, and after the moisture and free acid are detected to be qualified, obtaining the prepared non-aqueous electrolyte.

Exemplarily, the method includes the following steps:

mixing (b) a non-aqueous organic solvent, (c) at least one compound represented by formula 1, and (e) vinyl sulfate evenly; and detecting moisture, and after the moisture is detected to be qualified, then freezing at a low temperature about $-10°$ C. for 2-5 hours, and then adding (a) a lithium quickly, and after the moisture and free acid are detected to be qualified, obtaining the prepared non-aqueous electrolyte.

Exemplarily, the method includes the following steps:

mixing (b) a non-aqueous organic solvent, (c) at least one compound represented by formula 1, (d) a nitrile compound including at least one of 1,3,6-hexane trinitrile, glycerol trinitrile, and 3-methoxypropionitrile, and (e) vinyl sulfate evenly, and detecting moisture, and after the moisture is detected to be qualified, then freezing at a low temperature about $-10°$ C. for 2-5 hours, and then adding (a) a lithium quickly, and after the moisture and free acid are detected to be qualified, obtaining the prepared non-aqueous electrolyte.

The present disclosure also provides a lithium-ion battery, the lithium-ion battery includes the above-mentioned non-aqueous electrolyte.

According to the present disclosure, the lithium-ion battery further includes a positive electrode sheet containing a positive electrode active material, a negative electrode sheet containing a negative electrode active material, and a lithium-ion diaphragm.

According to the present disclosure, the positive electrode active material is selected from one or more of layered lithium transition metal composite oxide, a lithium manganate, and a lithium cobalt oxide mixed ternary material; a chemical formula of the layered lithium transition metal composite oxide is $Li_{1+x}Ni_y Co_z M_{(1-y-z)}Q_2$, where $-0.1 \leq x \leq 1$, $0 \leq y \leq 1$, $0 \leq z \leq 1$, and $0 \leq y+z \leq 1$; where M is one or more of Mg, Zn, Ga, Ba, Al, Fe, Cr, Sn, V, Mn, Sc, Ti, Nb, Mo and Zr; and Q is one or more of O, F, P and S.

According to the present disclosure, the negative active material is selected from one or more of a carbon material, a silicon-based material, a tin-based material or their corresponding alloy materials.

According to the present disclosure, an operating voltage range of the lithium-ion battery is 4.25V and more.

According to the presort disclosure, after cycling for 300 cycles under a charge-discharge system of being charged at 0.3 C and being discharged at 0.5 C, at 5° C., a thickness change rate of the lithium-ion battery is less than or equal to 7.0% (for example, less than or equal to 6.9%); and a capacity retention rate is greater than or equal to 98% (for example, greater than or equal to 98.1%).

According to the present disclosure, after cycling for 500 cycles under a charge-discharge system of being charged to 4.2V at 1 C, then charged to 4.4V at 0.7 C, then charged at a constant voltage of 4.4V until a cut-off current of 0.05 C, and then discharged to 3V at 0.5 C, at 25° C., a thickness change rate of the lithium-ion battery is less than or equal to 8.5%; and a capacity retention rate is greater than or equal to 82% (for example, greater than or equal to 82.8%).

According to the present disclosure, after cycling for 400 cycles under a charge-discharge system of being charged to 4.4V at a constant current of 0.7 C, charged at a constant voltage of 4.4V until a cut-off current of 0.05 C, and then discharged at 0.5 C, at 45° C., a thickness change rate of the lithium-ion battery is less than or equal to 9.1%; and a capacity retention rate is greater than or equal to 79% (for example, greater than or equal to 79.6%).

According to the present disclosure, a thickness change rate of the lithium-ion battery is less than or equal to 9.0% (for example, less than or equal to 8.9%) after the lithium-ion battery is charged to 4.4V at 0.7 C, then charged at a constant voltage of 4.4V until a cut-off current is 0.05 C, then discharged to 3.0V at a constant current of 0.5 C, then charged to 4.4V at 0.7 C', and then charged at a constant voltage of 4.4V until a cut-off current is 0.05 C, at 60° C., and is set aside for 14 days.

Terms and Explanations

The term "halogen" refers to F, Cl, Br and I.

The term "$C_1$-$C_6$ alkyl group" should be understood to preferably represent a linear or branched saturated monovalent hydrocarbon group having 1 to 6 carbon atoms, preferably a $C_1$-$C_5$ alkyl group. "$C_1$-$C_6$ alkyl group" should be understood to preferably represent a linear or branched saturated monovalent hydrocarbon group having 1, 2, 3, 4, 5 or 6 carbon atoms. The alkyl group is, for example, methyl, ethyl, propyl, butyl, pentyl, hexyl, isopropyl, isobutyl, sec-butyl, tert-butyl, isoamyl, 2-methylbutyl, 1-methylbutyl, 1-ethylpropyl, 1,2-dimethylpropyl, neopentyl, 1,1-dimethylpropyl, 4-methylpentyl, 3-methylpentyl, 2-methylpentyl, 1-methylpentyl, 2-ethylbutyl, 1-ethylbutyl, 3,3-dimethylbutyl, 2,2-dimethylbutyl, 1,1-dimethylbutyl, 2,3-dimethylbutyl, 1,3-dimethylbutyl, 1,2-dimethylbutyl, etc., or their isomers. In particular, the group is, for example, methyl, ethyl, propyl, butyl, isopropyl, isobutyl, sec-butyl, tert-butyl, more particularly, the group has 1, 2 or 3 carbon atoms ("$C_{1-3}$ alkyl group"), for example, methyl, ethyl, n-propyl or isopropyl.

The term "$C_{2-5}$ alkenyl group" should be understood to preferably represent a linear or branched monovalent hydrocarbon group which contains one or more double bonds and has 2, 3, 4 or 5 carbon atoms, especially, 2 or 3 carbon atoms ("$C_{2-3}$ alkenyl group"). It should be understood that in the case where the alkenyl group contains more than one double bonds, the double bonds may be separated from each other or conjugated. The alkenyl group is, for example, vinyl, allyl, (E)-2-methylvinyl, (Z)-2-methylvinyl, (E)-but-2-enyl, (Z)-but-2-enyl, (E)-but-1-enyl, (Z)-but-1-enyl, pent-4-enyl, (E)-pent-3-enyl, (Z)-pent-3-enyl, (E)-pent-2-enyl, (Z)-pent-2-enyl, (E)-pent-1-enyl, (Z)-pent-1-enyl, hex-5-enyl, (E)-hex-4-enyl, (Z)-hex-4-enyl, (E)-hex-3-enyl, (Z)-hex-3-enyl, (E)-hex-2-enyl, (Z)-hex-2-enyl, (E)-hex-1-enyl, (Z)-hex-1-enyl, isopropenyl, 2-methylprop-2-enyl, 1-methylprop-2-enyl, 2-methylprop-1-enyl, (E)-1-methylprop-1-enyl, (Z)-1-methylprop-1-enyl, 3-methylbut-3-enyl, 2-methylbut-3-enyl, 1-methylbut-3-enyl, 3-methylbut-2-enyl, (E)-2-methylbut-2-enyl, (Z)-2-methylbut-2-enyl, (E)-1-methylbut-2-enyl, (Z)-1-methylbut-2-enyl, (E)-3-methylbut-1-enyl, (Z)-3-methylbut-1-enyl, (E)-2-methylbut-1-enyl, (Z)-2-methylbut-1-enyl, (E)-1-methylbut-1-enyl, (Z)-1-methylbut-1-enyl, 1,1-dimethylprop-2-enyl, 1-ethylprop-1-enyl, 1-propylvinyl, or 1-isopropyl vinyl.

The term "$C_2$-$C_5$ alkynyl group" should be understood to represent a linear or branched monovalent hydrocarbon group which contains one or more triple bonds and has 2 to 5 carbon atoms, especially, 2 or 3 carbon atoms ("$C_2$-$C_3$ alkynyl group") The alkynyl group is, for example, ethynyl, prop-1-ynyl, prop-2-ynyl, but-1-ynyl, but-2-ynyl, but-3-ynyl, pent-1-ynyl, pent-2-ynyl, pent-3-ynyl, pent-4-ynyl, hex-1-ynyl, hex-2-ynyl, hex-3-ynyl, hex-4-ynyl, hex-5-ynyl, 1-methylprop-2-ynyl, 2-methylbut-3-ynyl, 1-methylbut-3-ynyl, 1-methylbut-2-ynyl, 3-methylbut-1-ynyl, 1-ethylprop-2-ynyl. In particular, the alkynyl group is ethynyl, prop-1-ynyl or prop-2-ynyl.

The beneficial effects of the present disclosure:

The present disclosure provides a non-aqueous electrolyte for a lithium-ion battery and a lithium-ion battery using the non-aqueous electrolyte. The non-aqueous electrolyte used in the present disclosure includes (a) a lithium, (b) a non-aqueous organic solvent, and (c) at least one compound represented by formula 1; where the non-aqueous electrolyte further includes at least one of the following components (d) and (e): (d) a nitrile compound including at least one of 1,3,6-hexane trinitrile, glycerol trinitrile and 3-methoxypropionitrile, and (e) vinyl sulfate. Where at least one compound (c) represented by formula 1 has a relatively lower reaction potential, and can preferentially form a dense and reduced impedance film on a surface of the positive and negative electrode sheets, and at the same time a nitrile compound (d) including at least one of 1,3,6-hexane trinitrile, glycerol trinitrile, and 3-methoxypropionitrile can further protect the positive electrode sheet and improve the toughness of the film through a complexation effect at a position of the film formed by the compound represented by formula 1. And the vinyl sulfate (e) can further make up for a denseness of the positive electrode surface film, and can also form a low-impedance SEI (solid electrolyte interphase) film on the negative electrode. Through the synergistic effect between them, the present disclosure protects the positive electrode and at the same time, also has a certain protective effect on the negative electrode, and the impedance of film is low. The battery has an excellent high temperature storage performance, high temperature cycle performance and low temperature charge and discharge performance.

DESCRIPTION OF EMBODIMENTS

Hereinafter, the present disclosure will be further described in detail in conjunction with specific embodiments. It should be understood that the following embodiments are only to exemplarily illustrate and explain the present disclosure, and should not be construed as limiting protection scope of the present disclosure. All technical solution implemented based on the foregoing contents of the present disclosure are covered within the scope intended to be protected by the present disclosure.

The experimental methods used in the following examples are conventional methods unless otherwise specially stated: the reagents and materials used in the following examples can be obtained from commercial sources unless otherwise specially stated.

Comparative Example 1 ☐

(1) Preparation of a Positive Electrode Sheet 4.4V lithium cobalt oxide (LCO) as a positive active material, polyvinylidene fluoride (PVDF) as a binder, and acetylene black as a conductive agent are mixed in a weight ratio of 97:1.5:1.5, and N-methylpyrrolidone (NMP) is added, stirring under an action of a vacuum mixer until a mixed system becomes a positive electrode slurry with uniform fluidity; the positive electrode slurry is uniformly coated on an aluminum foil with a thickness of 12 μm; after the above-mentioned well-coated aluminum foil is baked in an oven with five different temperature gradients, then it is dried in an oven at 120° C. for 8 hours, and then is rolled and slit, to obtain a desired positive electrode sheet.

(2) Preparation of a Negative Electrode Sheet

Graphite as a negative active material, sodium car boxy methyl cellulose (CMC-Na) as a thickener, styrene butadiene rubber as a binder, acetylene black as a conductive agent are mixed in a weight ratio of 97:1:1:1, and a deionized water is added. A negative electrode slurry is obtained under an action of a vacuum mixer; the negative electrode slurry is evenly coated on a copper foil with a thickness of 8 μm;

the copper foil is dried at room temperature and then is transferred to an oven to dry at 80° C. for 10 hours, and then is cold pressed and slit, to obtain the negative electrode sheet.

(3) Preparation of an Electrolyte

In a glove box filled with argon gas and with qualified water and oxygen contents, ethylene carbonate, propylene carbonate, diethyl carbonate, n-propyl propionate, and fluoroethylene carbonate are mixed evenly in a mass ratio of 13.5:13.5:13.5:51:8.5 (solvents and additives need to be normalized together), then 14.3 wt % of fully dried lithium hexafluorophosphate ($LiPF_6$) is quickly add to it, and is dissolved in the organic solvents, stirring well, and after passing moisture and free acid tests, an electrolyte of Comparative Example 1 is obtained.

(4) Preparation of a Diaphragm

8 μm thick polyethylene is selected as the diaphragm (provided by Asahi Kasei).

(5) Preparation of a Lithium-Ion Battery

The positive electrode sheet, the diaphragm, and the negative electrode sheet, as prepared above, are laid in order, to ensure that the diaphragm is located between the positive and negative electrode sheets and plays a role of isolation, and then a bare battery core without liquid injection is got by winding: the bare battery core is placed in an outer packaging foil, the electrolyte prepared above is injected into a dried bare battery core, going through processes of vacuum packaging, standing, forming, shaping, and sorting etc., to obtain a required lithium-ion battery.

(6) Low Temperature Cycle Experiment at 5° C.

Before a test, a thickness $D_0$ of a fully charged battery core is tested. The battery is placed in an environment of 5±2° C. and left to stand for 3 hours. When the battery core body reaches 5±2° C., the battery is charged to 4.4V at 0.3 C, then is charged at a constant voltage of 4.4V until a cut-off current is 0.05 C, then is discharged to 3V at 0.5 C, and an initial capacity $Q_0$ is recorded. When a required number of cycles is reached or a capacity attenuation rate is less than 70% or the thickness exceeds the thickness required by the test, the previous discharge capacity is used as the battery's capacity $Q_1$, and a capacity retention rate (%) is calculated, then the battery is fully charged, and the battery core is taken out, then left at room temperature for 3 hours, and the thickness $D_1$ at full charge is tested, and a thickness change rate (%) is calculated. Recorded results are shown in Table 2. Where calculation formulas used are as follows:

The thickness change rate (%)=$(D_1-D_0)/D_0 \times 100\%$; and the capacity retention rate (%)=$Q_1/Q_0 \times 100\%$.

(7) Room Temperature Cycle Experiment at 25° C.

Before the test, the thickness $D_0$ of the fully charged battery core is tested. The battery is placed in an environment of 25±3° C. and left to stand for 3 hours. When the battery core body reaches 25±3° C., the battery is charged to 4.4V at 1 C, then is charged to 4.4V at 0.7 C, then is charged at a constant voltage of 4.4V until a cut-off current is 0.05 C, then is discharged to 3V at 0.5 C, and an initial capacity $Q_0$ is recorded. When the required number of cycles is reached or the capacity attenuation rate is less than 70% or the thickness exceeds the thickness required by the test, the previous discharge capacity is used as the battery's capacity $Q_2$, and the capacity retention rate (%) is calculated, then the battery is fully charged, and the battery core is taken out, then left at room temperature for 3 hours, and the thickness $D_2$ at full charge is tested, and the thickness change rate (%) is calculated. Recorded results are shown in Table 2. Where the calculation formulas used are as follows:

The thickness change rate (%)=$(D_2-D_0)/D_0 \times 100\%$; and the capacity-retention rate (%)=$Q_2/Q_0 \times 100\%$.

(8) High Temperature Cycle Experiment at 45° C.

Before the test, the thickness $D_0$ of the fully charged battery core is tested. The battery is placed in an environment of 45±3° C. and left to stand for 3 hours. When the battery core body reaches 45±3° C., the battery is charged to 4.4V at a constant current of 0.7 C, then is charged at a constant voltage of 4.4V until a cut-off current is 0.05 C, then is discharged at 0.5 C, and an initial capacity $Q_0$ is recorded. The cycle is repeated. When required number of cycles is reached or the capacity attenuation rate is less than 70% or the thickness exceeds the thickness required by the test, the previous discharge capacity is used as the battery's capacity $Q_3$, and then the capacity retention rate (%) is calculated, then the battery is fully charged, and the battery core is taken out, then left at room temperature for 3 hours, and the thickness $D_3$ at full charge is tested, and the thickness change rate (%) is calculated. Recorded results are shown in Table 2. Where the calculation formulas used are as follows:

The thickness change rate (%)=$(D_3-D_0)/D_0 \times 100\%$; and the capacity retention rate (%)=$Q_3/Q_0 \times 100\%$.

(9) High Temperature Storage Experiment at 60° C.

At 25° C., the thickness $D_0$ of the fully charged battery core is tested, the sorted battery is charged to 4.4V at 0.7 C, then is charged at a constant voltage of 4.4V until a cut-off current is 0.05 C, then is discharged to 3.0V at a constant current of 0.5 C, then is charged to 4.4V at 0.7 C, then is charged at a constant voltage of 4.4V until a cut-off current is 0.05 C, and it is placed in an environment at 60° C. for 14 days. The thickness $D_4$ at full charge is tested, and the thickness change rate (%) is calculated. Recorded results are shown in Table 2. Where the calculation formula used is as follows.

The thickness change rate (%)=$(D_4-D_0)/D_0 \times 100\%$.

TABLE 1

Compositions and contents of electrolytes of Examples 1-13 and Comparative Examples 1-9

|  | A1 | A2 | A4 | Succinonitrile | 1,3,6-hexane trinitrile | Glycerol trinitrile | 3-methoxy propionitrile | Vinyl sulfate |
|---|---|---|---|---|---|---|---|---|
| Comparative Example 1 |  |  |  |  |  |  |  |  |
| Comparative Example 2 | 0.5 |  |  |  |  |  |  |  |
| Comparative Example 3 |  | 0.5 |  |  |  |  |  |  |

TABLE 1-continued

Compositions and contents of electrolytes of Examples 1-13 and Comparative Examples 1-9

| | A1 | A2 | A4 | Succinonitrile | 1,3,6-hexane trinitrile | Glycerol trinitrile | 3-methoxy propionitrile | Vinyl sulfate |
|---|---|---|---|---|---|---|---|---|
| Comparative Example 4 | | 0.5 | | | | | | |
| Comparative Example 5 | | | | | 1 | | | |
| Comparative Example 6 | | | | | | 1 | | |
| Comparative Example 7 | | | | | | | 1 | |
| Comparative Example 8 | | | | | | | | 1 |
| Comparative Example 9 | 0.5 | | | 1 | | | | |
| Example 1 | 0.5 | | | | 1 | | | |
| Example 2 | 0.5 | | | | | 1 | | |
| Example 3 | | 0.5 | | | 1 | | | |
| Example 4 | 0.5 | | | | | | 1 | |
| Example 5 | 0.5 | | | | | | | 1 |
| Example 6 | | 0.5 | | | | | | 1 |
| Example 7 | 0.5 | | | | 1 | | | 1 |
| Example 8 | 0.5 | | | | | 1 | | 1 |
| Example 9 | 0.5 | | | | | | 1 | 1 |
| Example 10 | | 0.5 | | | 1 | | | 1 |
| Example 11 | | 0.5 | | | | 1 | | 1 |
| Example 12 | 0.5 | 0.5 | | | 1 | | | 1 |
| Example 13 | | 0.5 | | | 1 | | 1 | 1 |

Annotation: the unit of the content of each component is wt %

TABLE 2

Comparisons of experimental results of batteries of Examples 1-13 and Comparative Examples 1-9

| | 300 cycles at 5° C. | | 500 cycles at 25° C. | | 400 cycles at 45° C. | | 60° C./14 days |
|---|---|---|---|---|---|---|---|
| | Thickness change rate | Capacity retention rate | Thickness change rate | Capacity retention rate | Thickness change rate | Capacity retention rate | Thickness change rate |
| Comparative example 1 | 5.4% | 99.5% | 13.2% | 79.1% | 14.0% | 70.5% | 12.3% |
| Comparative example 2 | 6.3% | 98.4% | 9.4% | 82.7% | 9.7% | 78.1% | 9.4% |
| Comparative example 3 | 6.1% | 98.7% | 9.1% | 81.7% | 9.5% | 78.5% | 9.3% |
| Comparative example 4 | 6.7% | 97.9% | 9.3% | 82.4% | 9.3% | 78.8% | 9.1% |
| Comparative example 5 | 7.5% | 98.2% | 8.3% | 83.1% | 8.5% | 79.4% | 8.7% |
| Comparative example 6 | 6.5% | 98.5% | 8.6% | 83.5% | 8.9% | 79.2% | 8.9% |
| Comparative example 7 | 5.8% | 99.0% | 8.2% | 84.3% | 8.7% | 79.7% | 8.8% |
| Comparative example 8 | 6.0% | 98.8% | 8.9% | 82.5% | 9.1% | 78.3% | 9.5% |
| Comparative example 9 | 6.7% | 98.3% | 8.3% | 83.1% | 8.7% | 79.3% | 9.1% |
| Example 1 | 6.4% | 98.5% | 8.0% | 83.4% | 8.3% | 80.2% | 8.5% |
| Example 2 | 6.6% | 98.7% | 8.2% | 83.8% | 8.6% | 80.5% | 8.6% |
| Example 3 | 6.9% | 98.6% | 8.0% | 83.5% | 9.1% | 79.6% | 8.4% |
| Example 4 | 5.5% | 99.2% | 7.9% | 84.7% | 8.3% | 80.3% | 8.2% |
| Example 5 | 5.9% | 98.6% | 8.5% | 83.0% | 8.6% | 80.6% | 8.9% |
| Example 6 | 6.2% | 98.3% | 8.5% | 82.8% | 8.4% | 80.3% | 8.6% |
| Example 7 | 6.0% | 98.9% | 7.6% | 83.8% | 7.9% | 81.8% | 8.1% |
| Example 8 | 6.3% | 98.7% | 7.8% | 84.3% | 8.1% | 81.6% | 8.3% |
| Example 9 | 5.3% | 99.3% | 7.5% | 85.3% | 8.0% | 81.4% | 7.9% |
| Example 10 | 6.4% | 99.1% | 7.6% | 83.9% | 7.8% | 81.8% | 8.0% |
| Example 11 | 6.6% | 98.1% | 7.7% | 83.7% | 7.9% | 81.6% | 8.2% |
| Example 12 | 5.7% | 99.4% | 7.3% | 84.8% | 7.3% | 82.6% | 7.5% |
| Example 13 | 6.2% | 99.4% | 7.3% | 84.5% | 7.2% | 82.9% | 7.3% |

Examples 1-13 and Comparative Examples 2-9

The preparation processes of Examples 1-13 and Comparative Examples 2-9 are the same as the preparation process of Comparative Example 1. The only difference lies in the components and contents of the electrolytes. The specifically added components and contents thereof are shown in Table 1 The test results are listed in Table 2.

It can be seen from above Table 2 that the batteries prepared in the examples of the present application have achieved a better electrical performance. The specific analysis is as follows:

Through comparisons of Comparative Example 1 and Comparative Examples 2-10, it can be found that on the basis of a blank electrolyte, the compound represented by formula 1, the nitrile compound and the vinyl sulfate can all improve the high-temperature cycle performance and high-temperature storage performance of the battery, but all of them will degrade low-temperature cycle performance.

Through comparisons of Comparative Examples 2-10 and Examples 1-6, a combination of the compound represented by formula 1 and the nitrile compound including at least one of 1,3,6-hexane trinitrile, glycerol trinitrile, and 3-methoxypropionitrite, or a combination of the compound represented by formula 1 and the vinyl sulfate, can improve the high temperature cycle performance and high temperature storage performance of the battery, and take into account the low temperature cycle performance.

Through Comparative Example 9 and Examples 1-2, 4, it can be found that compared with succinonitrile, the nitrile compounds, i.e., 1,3,6-hexane trinitrile, glycerol trinitrile and 3-methoxypropionitrile in the present disclosure have a better high-temperature cycle performance and high-temperature storage performance.

Through comparisons of Examples 1 and 7, Examples 2 and 8, Examples 4 and 9, Examples 3 and 10, and Examples 6 and 11, it can be found that a combination of the compound represented by formula 1, the nitrile compound including at least one of 1,3,6-hexane trinitrile, glycerol trinitrile, and 3-methoxypropionitrile, and the vinyl sulfate can further improve the high-temperature cycle performance and high-temperature storage of the battery.

Through comparisons of Examples 12 and 7, Examples 13 and 10, it can be found that a combination of multiple compounds represented by formula 1 or a combination of multiple nitrile compounds including at least one of 1,3,6-hexane trinitrile, glycerol trinitrile, and 3-methoxypropionitrile can further improve the high-temperature cycle performance and high-temperature storage performance of the battery.

The embodiments of the present disclosure have been described above. However, the present disclosure is not limited to the above-mentioned embodiments. Any modifications, equivalent replacements, improvements, etc., made within the spirit and principle of the present disclosure should be included in the protection scope of the present disclosure.

What is claims is:

1. A non-aqueous electrolyte, comprising: (a) a lithium, (b) a non-aqueous organic solvent, and (c) at least one compound represented by formula 1; wherein the non-aqueous electrolyte further comprises at least one of the following components (d) and (e):

(d) a nitrile compound including at least one of 1,3,6-hexane trinitrile, glycerol trinitrile, and 3-methoxypropionitrile, and (e) vinyl sulfate;

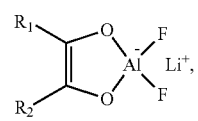

formula 1 wherein $R_1$ and $R_2$ are the same or different, and are each independently selected from hydrogen, halogen, a halogen-substituted or unsubstituted $C_1$-$C_6$ alkyl group, a halogen-substituted or unsubstituted $C_2$-$C_5$ alkenyl group, or a halogen-substituted or unsubstituted $C_2$-$C_5$ alkynyl group.

2. The non-aqueous electrolyte according to claim 1, wherein the compound represented by formula 1 is selected from at least one of the following compounds A1 to A5:

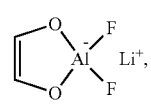

A1

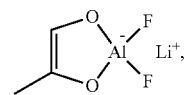

A2

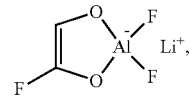

A3

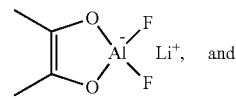

A4 and

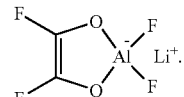

A5

3. The non-aqueous electrolyte according to claim 1, wherein the nitrile compound is selected from at least one of 1,3,6-hexanetrinitrile, glycerol trinitrile, and 3-methoxypropionitrile.

4. The non-aqueous electrolyte according to claim 1, wherein a content of the compound represented by formula 1 is 0.1-10 wt % of a total mass of the non-aqueous electrolyte.

5. The non-aqueous electrolyte according to claim 1, wherein a content of the nitrile compound is 0-8 wt % of the total mass of the non-aqueous electrolyte.

6. The non-aqueous electrolyte according to claim 1, wherein a content of the vinyl sulfate is 0-2 wt % of the total mass of the non-aqueous electrolyte.

7. A lithium-ion battery, comprising the non-aqueous electrolyte according to claim 1.

8. The lithium-ion battery according to claim 7, wherein the lithium-ion battery further comprises a positive electrode sheet containing a positive electrode active material, a negative electrode sheet containing a negative electrode active material and a lithium-ion diaphragm.

9. The lithium-ion battery according to claim 8, wherein the positive electrode active material is selected from one or more of a layered lithium transition metal composite oxide, a lithium manganate and a lithium cobalt oxide mixed ternary material; a chemical formula of the layered lithium transition metal composite oxide is $Li_{1+x}Ni_yCo_zM_{(1-y-z)}Q_2$, wherein $-0.1 \le x \le 1$, $0 \le y \le 1$, $0 \le z \le 1$, and $0 \le y+z \le 1$; wherein M is one or more of Mg, Zn, Ga, Ba, Al, Fe, Cr, Sn, V, Mn, Sc, Ti, Nb, Mo and Zr; Q is one or more of O, F, P and S: the negative electrode active material is selected from one or more of a carbon material, a silicon-based material, a tin-based material or their corresponding alloy materials.

10. The lithium-ion battery according to claim 7, wherein an operating voltage range of the lithium-ion battery is 4.25V and more.

11. The lithium-ion battery according to claim 8, wherein an operating voltage range of the lithium-ion battery is 4.25V and more.

12. The lithium-ion battery according to claim 9, wherein an operating voltage range of the lithium-ion battery is 4.25V and more.

\* \* \* \* \*